United States Patent
Abdelhameed et al.

(10) Patent No.: US 12,335,360 B2
(45) Date of Patent: Jun. 17, 2025

(54) METHOD AND SYSTEM FOR PERFORMING TIME-SYNCHRONIZATION BETWEEN UNITS OF A COMMUNICATION BUS SYSTEM

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 233 days.

(21) Appl. No.: 17/917,091

(22) PCT Filed: Apr. 6, 2020

(86) PCT No.: PCT/EP2020/059707
§ 371 (c)(1),
(2) Date: Oct. 5, 2022

(87) PCT Pub. No.: WO2021/204342
PCT Pub. Date: Oct. 14, 2021

(65) Prior Publication Data
US 2023/0155806 A1    May 18, 2023

(51) Int. Cl.
*H04L 7/00* (2006.01)
*H04J 3/06* (2006.01)
*H04J 3/14* (2006.01)

(52) U.S. Cl.
CPC .......... *H04L 7/0012* (2013.01); *H04J 3/0655* (2013.01); *H04J 3/0667* (2013.01); *H04J 3/14* (2013.01)

(58) Field of Classification Search
CPC ..... H04L 7/0012; H04J 3/0655; H04J 3/0667; H04J 3/14
See application file for complete search history.

(56) References Cited

U.S. PATENT DOCUMENTS

| | | | |
|---|---|---|---|
| 6,370,159 B1 * | 4/2002 | Eidson | G06F 1/14 370/503 |
| 8,971,357 B2 * | 3/2015 | Bui | H04J 3/0658 370/503 |

(Continued)

FOREIGN PATENT DOCUMENTS

CN    108168918 B    12/2019

OTHER PUBLICATIONS

International Search Report (PCT/ISA/210) issued in PCT Application No. PCT/EP2020/059707 dated Dec. 10, 2020 (three (3) pages).

(Continued)

*Primary Examiner* — Chandrahas B Patel
(74) *Attorney, Agent, or Firm* — Crowell & Moring LLP (57) ABSTRACT

A method for performing time-synchronization between a master clock of a master unit and a plurality of slave clocks of a corresponding plurality of slave units includes sending a forward time-synchronization message indicative of the master clock from the master unit to the plurality of slave units, in order to enable the plurality of slave units to time-synchronize their respective slave clocks with the master clock. The method also includes receiving a reverse time-synchronization message indicative of the respective slave clock from each of the plurality of slave units at a first validator. The method also includes time-synchronizing a plurality of validator clocks of the first validator to the corresponding plurality of slave clocks using the reverse time-synchronization messages from the plurality of slave units, and validating the time-synchronization between the plurality of slave clocks at the first validator based on the plurality of validator clocks.

13 Claims, 3 Drawing Sheets

(56) References Cited

U.S. PATENT DOCUMENTS

| | | | |
|---|---|---|---|
| 9,331,838 B2* | 5/2016 | Nobauer | H04L 67/12 |
| 2015/0003443 A1 | 1/2015 | Koenigseder et al. | |
| 2017/0214479 A1* | 7/2017 | Heine | H04J 3/0667 |
| 2018/0088584 A1 | 3/2018 | Tascione et al. | |
| 2019/0363815 A1 | 11/2019 | Bogenberger et al. | |

OTHER PUBLICATIONS

Written Opinion (PCT/ISA/237) issued in PCT Application No. PCT/EP2020/059707 dated Dec. 10, 2020 (seven (7) pages).
Raju, S. et al., "Time Synchronized Diagnostic Event Data Recording based on AUTOSAR", 2017 IEEE International Conference on Advanced Networks and Telecommunications Systems (ANTS), IEEE, Dec. 17, 2017, pp. 1-6, XP033358556 (six (6) pages).
Chinese-language Office Action issued in Chinese Appiication No. 202080099254.7 dated Feb. 14, 2025 with partial Engiish translation (13 pages).

* cited by examiner

METHOD AND SYSTEM FOR PERFORMING TIME-SYNCHRONIZATION BETWEEN UNITS OF A COMMUNICATION BUS SYSTEM

BACKGROUND AND SUMMARY OF THE INVENTION

The present document is directed at performing time-synchronization between different units or entities within a data communication bus system, such as a Controller Area Network Flexible Data-Rate, a CAN-FD, and/or a FlexRay bus system of a vehicle.

A vehicle may comprise different environment sensors which are configured to provide sensor data with regards to the environment of the vehicle. A control unit within the vehicle may make use of and/or may fuse the sensor data from the different environment sensors to determine an environment model which indicates the position of objects within the environment of the vehicle. The vehicle may then be operated, e.g. within an autonomous driving mode, based on the environment model. The environment sensors may be located in one or more different communications networks or communications bus systems of the vehicle. Example communication bus systems are a Controller Area Network (CAN) bus system, a CAN-FD (Flexible Data-Rate) bus system, a FlexRay bus system, a Local Interconnect Network (LIN) bus system, a Media Oriented Systems Transport (MOST) bus system and/or an Ethernet bus system.

The different environment sensors typically each comprise a local time clock which is configured to provide a time stamp for the sensor data which is captured by the respective environment sensor. The time stamps of the sensor data which is provided by the different sensors are typically taken into account when fusing the sensor data to determine the environment model.

Differences in the local times which are indicated by the local time clocks of the different environment sensors may lead to inaccuracies of the environment model and may impair autonomous driving.

The present document is directed at the technical problem of enabling high integrity time-synchronization between different units, notably between different sensors and/or a fusion unit, which are located in one or more different communication bus systems.

The technical problem is solved by the claimed invention.

According to an aspect a method for performing time-synchronization between a master clock of a master unit and a plurality of slave clocks of a corresponding plurality of slave units (e.g. 2 or more, or 3 or more, or 5 or more slave units) within a communication bus system is provided. The communication bus system may comprise or may be a Controller Area Network (CAN) bus system, such as a CAN-FD (Flexible Data-Rate) bus system. Alternatively, the communication bus system may be a FlexRay bus system, a Local Interconnect Network (LIN) bus system or a Media Oriented Systems Transport (MOST) bus system. The method may be performed (at least partially) by the master unit.

The master unit may be a gateway unit between the communication bus system and a communication network, notably an Ethernet network. The method may comprise time-synchronizing the master clock with a clock of a unit within the communication network, notably within the Ethernet network. Time-synchronizing may be performed using the forward and reverse time-synchronization scheme which is described in the present document. Hence, the master clock of the communication bus system may be time-synchronized with a master communication network, such as an Ethernet network, at a relatively high integrity level (e.g. ASIL D).

The plurality of slave clocks may be associated with a plurality of sensors (e.g. environment sensors of a vehicle, notably a car or a truck or a bus). Each of the sensors may be configured to provide sensor data with a time stamp generated by the respective slave clock. The time stamps may be generated by the respective slave clock according to a pre-determined safety integrity ASIL level (e.g. ASIL A or ASIL B or ASIL D). The time stamps of the sensor data may be used during fusion of the sensor data, in order to fuse sensor data which relates to the same time instant, thereby increasing the quality of an environment model which is generated based on the fused sensor data.

The method comprises sending a forward time-synchronization message indicative of the master clock from the master unit to the plurality of slave units, in order to enable the plurality of slave units to time-synchronize their respective slave clocks with the master clock. The forward time-synchronization message may be sent by the master unit. The forward time-synchronization message may be in accordance with the PTP (Precision Time Protocol) protocol. Hence, the method may comprise performing a forward time-synchronization from the master clock to the plurality of slave clocks.

In addition, the method comprises receiving (e.g. at the master unit) a reverse time-synchronization message indicative of the respective slave clock from each of the plurality of slave units at a first validator (which may be part of the master unit). In particular, a plurality of reverse time-synchronization messages may be received from the corresponding plurality of slave units. Each slave unit may send a corresponding reverse time-synchronization message which is indicative of the slave clock (i.e. of the time of the slave clock) of the respective slave unit. The reverse time-synchronization messages may be in accordance with the PTP protocol.

The method further comprises time-synchronizing a plurality of validator clocks of the first validator to the corresponding plurality of slave clocks, respectively, using the reverse time-synchronization messages from the plurality of slave units. Hence, the method may comprise performing a reverse time-synchronization from the plurality of slave clocks to a corresponding plurality of validator clocks of the first validator.

In addition, the method comprises validating the time-synchronization between the plurality of slave clocks, notably between the master clock and the plurality of slave clocks, at the first validator based on the plurality of validator clocks, notably based on a comparison of the time stamps of the plurality of validator clocks, of the first validator.

By performing a forward time-synchronization and backward time-synchronization, which make use of a joint validator for all the units within a communication bus system, time-synchronization with a relatively high integrity level may be achieved.

Validating the plurality of slave clocks at the first validator may comprise comparing validator times of the plurality of validator clocks of the first validator. The plurality of slave clocks may be validated at the first validator, if the validator times of the plurality of validator clocks of the first validator are time-synchronized. On the other hand, it may be determined that the plurality of slave clocks is not time-synchronized, if the validator times of at least two of the plurality of validator clocks of the first validator are not time-synchronized.

The method may comprise time-synchronizing validator clocks of a second validator to at least some of the plurality of slave clocks using the reverse time-synchronization messages from at least some of the plurality of slave units, and/or to the master clock using the forward time-synchronization message from the master unit. The second validator may be located at and/or implemented within a slave unit from the plurality of slave units. Hence, at least one additional validator may be provided at one of the slave units. Possibly all the slave units of the communication bus system may comprise a dedicated validator.

The method may further comprise validating the time-synchronization between the plurality of slave clocks, notably between the master clock and the plurality of slave clocks, at the second validator based on the validator clocks of the second validator. The second validator may be part of a different communication bus system than the first validator. In particular, the first validator may be part of an Ethernet bus system and/or the second validator may be part of a CAN-FD and/or FlexRay bus system.

Validating the slave clocks at the second validator may comprise comparing validator times of the validator clocks of the second validator. The slave clocks may be validated at the second validator, if the validator times of the validator clocks of the second validator are time-synchronized. On the other hand, it may be determined that the slave clocks are not time-synchronized, if the validator times of at least two of the validator clocks of the second validator are not time-synchronized. In an analogous manner, validation of the plurality of slave clocks may be performed at each of the plurality of validators.

In addition, the method may comprise validating the plurality of slave clocks for the communication bus system if, notably only if, the plurality of slave clocks has been validated at the first validator and at the second validator (notably at all of the validators of the communication bus system). Hence, a plurality of validators may be provided at different units of the communication bus system. The time-synchronization may be verified at each of the validators independently from one another. Overall time-synchronization may be confirmed, (only) if the slave clocks a validated at each one of the plurality of validators. By doing this, the integrity level of time-synchronization may be increased (e.g. to ASIL D).

The validator clocks of the first and/or the second validator may be implemented in a corresponding plurality of different time domains of a Synchronized Time-Base Manager of the AUTOSAR standard. As a result of this, a particularly efficient and reliable validation of time-synchronization may be performed.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to another aspect, a system for performing time-synchronization between a master clock of a master unit and a plurality of slave clocks of a corresponding plurality of slave units within a communication bus system is described. The system is configured to send a forward time-synchronization message indicative of the master clock from the master unit to the plurality of slave units, in order to enable the plurality of slave units to time-synchronize their respective slave clocks with the master clock. The system is further configured to receive a reverse time-synchronization message indicative of the respective slave clock from each of the plurality of slave units at a first validator. In addition, the system is configured to time-synchronize a plurality of validator clocks of the first validator to the corresponding plurality of slave clocks, respectively, using the reverse time-synchronization messages from the plurality of slave units. Furthermore, the system is configured to validate the time-synchronization between the plurality of slave clocks, notably between the master clock and the plurality of slave clocks, at the first validator based on the plurality of validator clocks of the first validator.

According to another aspect, a vehicle (notably a car or a truck or a bus or a motorcycle) is described, which comprises the system that is outlined in the present document.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

The invention is explained below in an exemplary manner with reference to the accompanying drawings.

DETAILED DESCRIPTION OF THE DRAWINGS

Figure 1A:
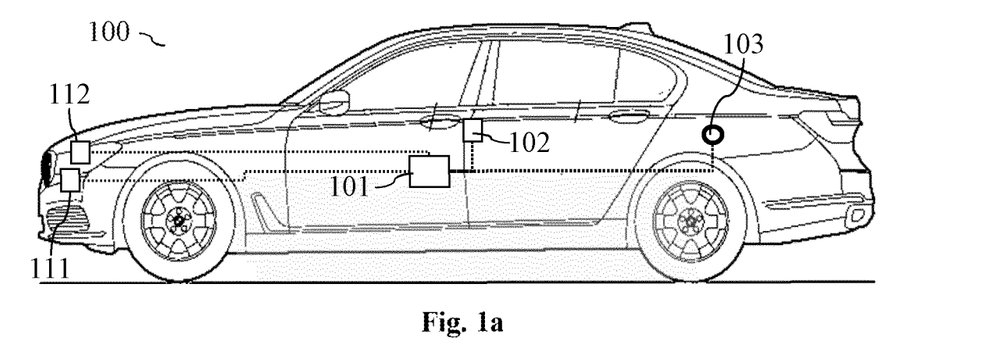
FIG. 1a shows example components of a vehicle.

As indicated above, the present document addresses the technical problem of performing time-synchronization at a high level of integrity, notably at a relatively high ASIL (Automotive Safety Integrity Level) Level, e.g. ASIL D. In this context FIG. 1a shows example components of a vehicle 100. The vehicle 100 comprises different sensors 111, 112 (notably environment sensors) which are configured to capture sensor data. Example sensors 111, 112 are a radar sensor, a camera, a lidar sensor, an ultrasonic sensor, etc.

A (central) control unit 101 of the vehicle 100 may be configured to perform fusion of the sensor data from the different sensors 111, 112. In particular, the control unit 101 may be configured to determine an environment model of the environment of the vehicle 100 based on the fused sensor data. Furthermore, the control unit 101 may be configured to operate one or more actors 103 (e.g. an engine, a motor, a braking system and/or a steering system) of the vehicle 100 in dependence of the environment model, e.g. in order to provide an autonomous driving mode of the vehicle 100. By way of example, an autonomous longitudinal control and/or lateral control of the vehicle 100 may be performed based on the fused sensor data.

Each sensor 111, 112 of the vehicle 100 typically comprises a local clock which indicates a local time at the respective sensor 111, 112. The sensor data of the different sensors 111, 112 may be provided with time stamps of the respective local clocks. The quality and/or reliability of the fused sensor data and/or of the environment model typically depends on the time synchronicity of the different local clocks. In particular, time offsets between the different local clocks of the different sensors 111, 112 typically lead to a reduced quality of the fused sensor data. This is illustrated in FIGS. 1b and 1c, which show a vehicle 100 and a static object 120, wherein the object 120 is located at a distance 121 from the vehicle 100.

Figure 1B:
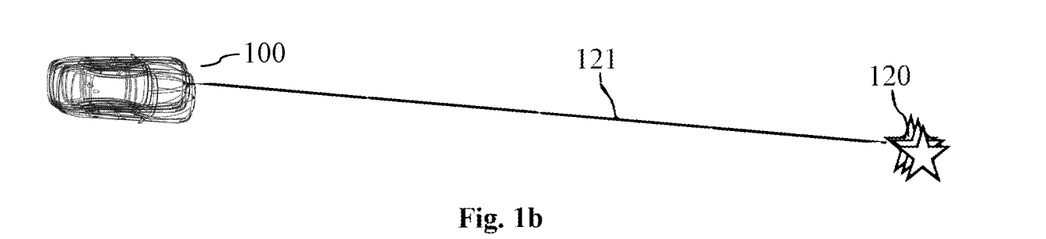
FIG. 1b illustrates the fusion of sensor data in case of time-synchronized environment sensors.
Figure 1C:
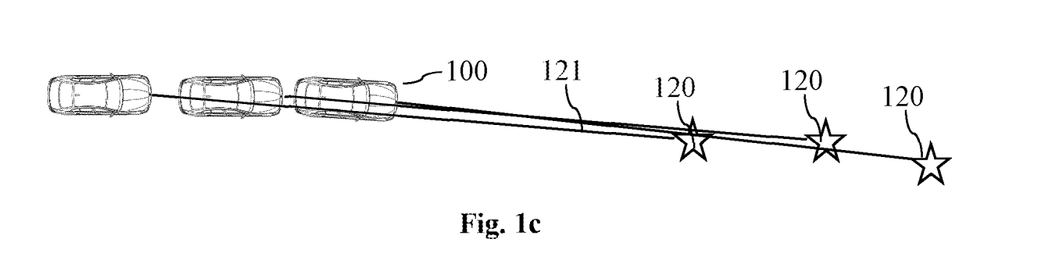
FIG. 1c illustrates the fusion of sensor data in case of environment sensors having time offsets.

FIG. 1b shows a situation for which the different local clocks are time-synchronized. As a result of this, the position of the vehicle 100 and/or the position of the static object 120, which are indicated by the sensor data of different sensors 111, 112, are similar for all of the different sensors 111, 112. On the other hand, if the local clocks of the different sensors 111, 112 exhibit time offsets with respect to one another, the sensor data of the different sensors 111, 112 may indicate different positions for the vehicle 100 and/or different positions for the static object 120.

Figure 2A:
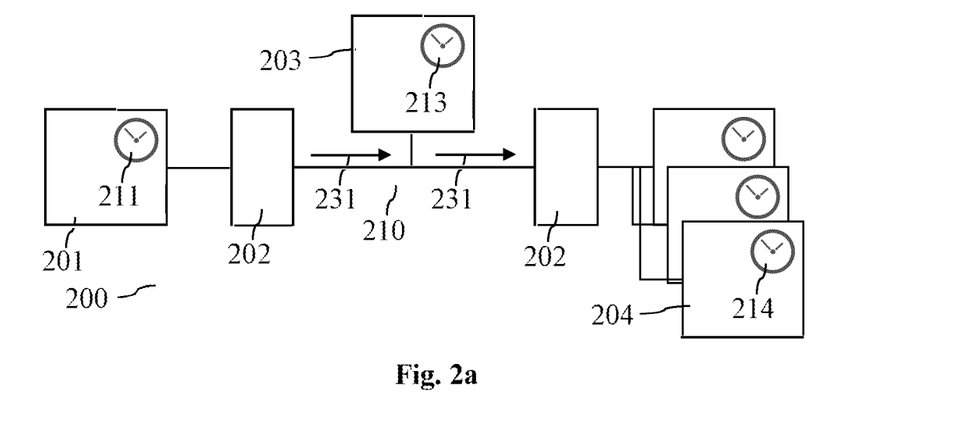
FIG. 2a shows an example time-synchronization system.

FIG. 2a shows an example system 200 for synchronizing the local time or the local clocks 213, 214 of different units 203, 204 within a vehicle 100. The system 200 may comprise a plurality of sensor units 204 for a corresponding plurality of sensors 111, 112 of the vehicle 100. Each sensor unit 204 may comprise a local clock 214 which is configured to indicate a local time. Furthermore, the system 200 may comprise a fusion unit 203 which is configured to fuse and/or combine the sensor data provided by the plurality of sensor units 204 (i.e. sensors 111, 112). The fusion unit 203 may comprise a local clock 213 which is configured to indicate a local time.

The different units 203, 204 may be interconnected through a communication network 210, notably an Ethernet network, comprising one or more switches 202. Furthermore, the synchronization system 200 comprises a master unit 201 comprising a master clock 211 which is configured to indicate a local time at the master unit 201 (also referred to herein as the master time).

The master unit 201 may be configured to perform time-synchronization with the fusion unit 203 and with the plurality of sensor units 204. For this purpose, the PTP (Precision Time Protocol) protocol may be used (specified in IEEE 1588). Due to the fact that at least some of the components within the communication network 210 typically exhibit a relatively low integrity level (notably a relatively low ASIL Level or only QM (Quality Management)), the integrity of time-synchronization is relatively low. As a result of this, the time stamps of the sensor data of the different sensors 111, 112 exhibit a relatively low integrity level.

The distribution of the master time from the master clock 211 to the slave entities 203, 204 or slave clocks 213, 214 may be viewed as a forward time-synchronization 231. As indicated above, the PTP protocol may be used for this forward time-synchronization 231.

Figure 2B:
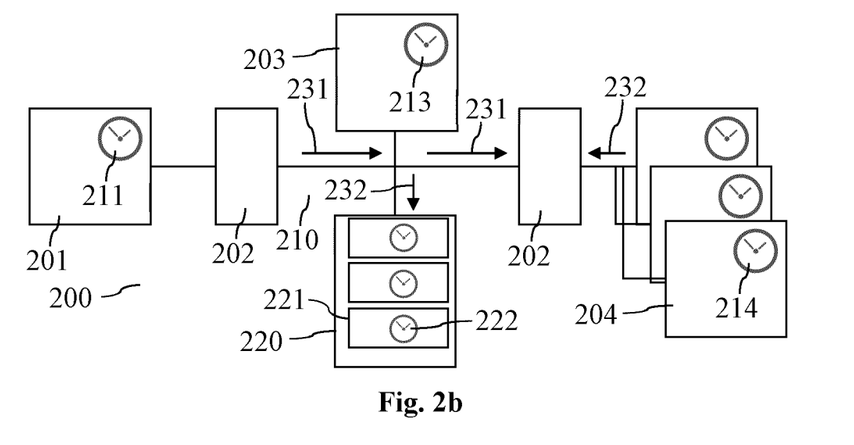
FIG. 2b shows an example time-synchronization system with a clock validator.

The system 200 may comprise a validator 220, as illustrated in FIG. 2b. The validator 220 may comprise a plurality of time domains 221 with a respective plurality of validator clocks 222. The validator 220 may exhibit a relatively high integrity level (e.g. ASIL D). The system 200 may be configured to perform backward or reverse time-synchronization 232, during which each of the slave clocks 213, 214 and the master clock 211 are time-synchronized with a respective one of the validator clocks 222. The backward or reverse time-synchronization 232 may be performed using the PTP protocol.

As a result of the backward time-synchronization 232, the validator 220 has access to each slave clock 213, 214 within the system 200 and/or to the master clock 211. In particular, the validator 220 comprises a plurality of validator clocks 222 which are time-synchronized with the corresponding plurality of slave clocks 213, 214. Furthermore, the validator 220 may comprise a validator clock 222 which is time-synchronized with the master clock 211.

The validator 220 may be configured to compare the different times or time stamps which are indicated by the different validator clocks 222. In particular, the validator 220 may be configured to verify whether the different times which are indicated by the different validator clocks 222 are synchronized or not. If the different times a synchronized, then it may be concluded with a relatively high integrity level (e.g. with ASIL D) that the slave clocks 213, 214 of the system 200 are time-synchronized with each other and/or with the master clock 211. As a result of this, it may be ensured at a relatively high integrity level that the time stamps of the sensor data of the different sensors 111, 112 are time-synchronized.

The validator 220 may be implemented in an efficient manner as a Synchronized Time-Base Manager of the AUTOSAR standard. In particular, the multiple time domains 221 of a Synchronized Time-Base Manager may be used for providing the different validator clocks 222.

The validator 220 may form a joint unit with the fusion unit 203. As a result of this, no backward or reverse synchronization 232 needs to be performed with the master clock 211.

For the forward and the reverse synchronization, the PTP Protocol may make use of different EtherTypes for the forward TSync messages and for the reverse TSync messages. By doing this, correct time-synchronization may be ensured within the Ethernet switches 202, as the Ethernet switches will only perform time stamping for forward TSync messages (as specified within the PTP Protocol).

Figure 3A:
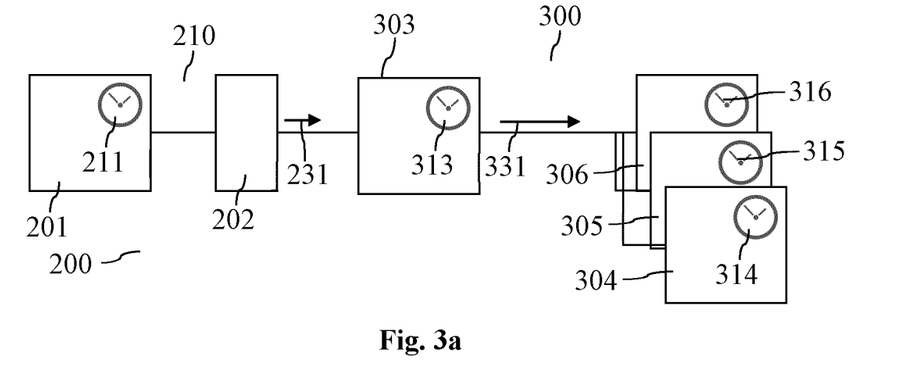
FIG. 3a shows an example time-synchronization system between different communication bus systems.
Figure 3B:
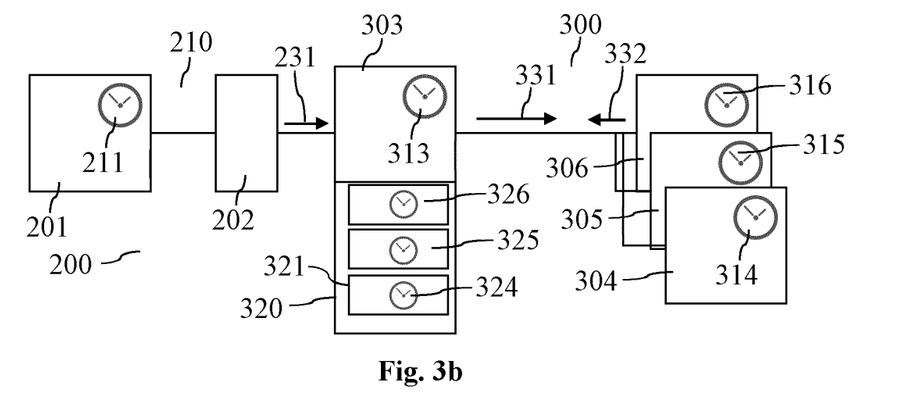
FIG. 3b shows an example time-synchronization system with a clock validator.

A vehicle 100 typically makes use of and/or comprises different communication networks and/or communication bus systems. FIGS. 3a to 3b illustrate a system 200 which comprises a first communication bus system 210 (e.g. an Ethernet bus) and a second communication bus system 300, e.g. a CAN FD bus and/or a FlexRay bus. Both communication buses 210, 300 may be linked with one another via a gateway unit 303. The gateway clock 313 of the gateway unit 303 may be synchronized with the master clock 211 of the master unit 201 using the forward backward synchronization scheme outlined within the present document (notably in the context of FIGS. 2a and 2b). By doing this, it may be ensured that the gateway clock 313 is time-synchronized with the master clock 211 at a relatively high integrity level (notably ASIL D). The gateway clock 313 may therefore be considered to be the master clock of the second communication bus system 300.

The second communication bus system 300 comprises the gateway unit 303 (which may be considered to be a master unit) and a plurality of slave units 304, 305, 306, each of the slave units 304, 305, 306 comprising a respective slave clock 314, 315, 316. The slave clocks 314, 315, 316 may be time-synchronized over the second communication bus 300 using the forward and backward synchronization scheme outlined in the context of FIGS. 2a and 2b. For this purpose, a forward time-synchronization message 331 may be sent from the gateway unit 303 to the slave units 304, 305, 306, thereby distributing the gateway clock 313 to the different slave units 304, 305, 306.

Furthermore, each of the slave units 304, 305, 306 may send a backward time-synchronization message 332 to a validator 320, in order to indicate the respective slave clocks 314, 315, 316 to the validator 320. The validator 320 comprises validator clocks 324, 325, 326 for each of the slave clocks 314, 315, 316. The validator 320 may be located at the gateway unit 303. This validator 320 may be referred to as the first validator.

Figure 3C:
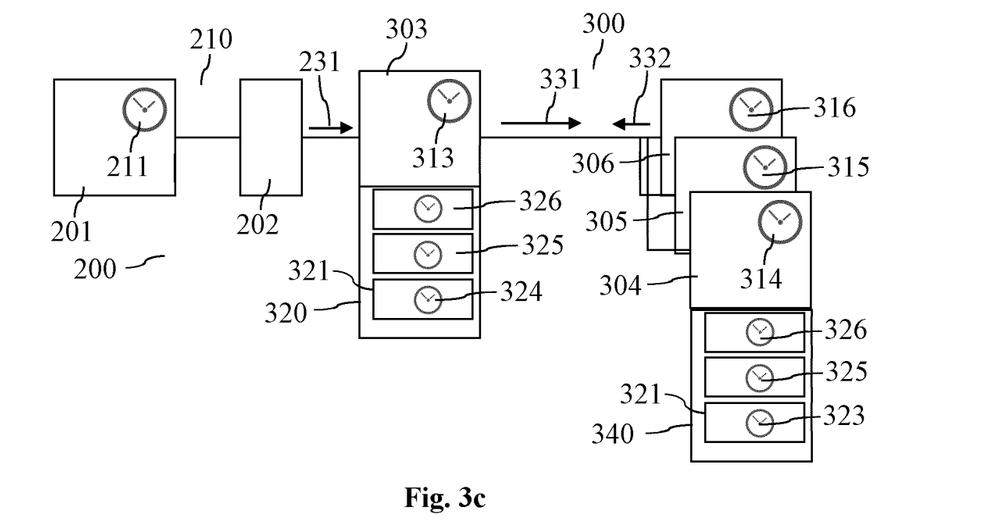
FIG. 3c shows an example time-synchronization system with multiple clock validators.

Furthermore, a validator 340 (referred to herein as the second validator) may be provided at one or more of the slave units 304, 305, 306. In FIG. 3c a second validator 340 is shown for the slave unit 304. The validator 304 of a slave unit 304 may comprise a validator clock 325, 326 for each of the slave clocks 315, 316 of the other slave units 305, 306. Furthermore, the validator 340 may comprise a validator clock 323 for the gateway clock 313.

As indicated above, the different validator clocks 323, 324, 325, 326 of the one or more validators 320, 340 may be implemented as different time domains 321, notably of an AUTOSAR Synchronized Time-Base Manager (STBM). The first validator 320 may be part of the gateway unit 303, and a second validator 340 may be part of a slave unit 304.

By using the above mentioned forward/backward time-synchronization scheme using a single validator 320 at the gateway unit 303, time-synchronization may be performed at the integrity level of the gateway unit 303 (which may e.g. by ASIL B). In order to further increase the integrity level of time-synchronization, one or more of the slave units 304, 305, 36 (e.g. slave unit 304 in the example shown in FIG. 3c) may be provided with a further validator 340, which comprises validator clocks 323, 325, 326 for the gateway clock 313 (taken from the forward time-synchronization message 331) and for the slave clocks 325, 326 of the other slave units 315, 316 (taken from the backward time-synchronization messages 332 of the other slave units 315, 316). The validator 340 of a slave unit 304 may be integrated into the slave unit 304. The validator 340 may comprise a validator clock for the slave unit 304.

Hence, multiple units 303, 304 within a communication bus system 300 may be provided with a validator 320, 340. The validators 320, 340 of the different units 303, 304 may be used to monitor and/or to control each other. In particular, it may be verified whether (individually) for each of the validators 320, 340 the validator clocks 323, 324, 325, 326 are time-synchronized with one-another. If this is the case for each of the multiple validators 320, 340 (individually), then it may be concluded at an increased integrity level that time-synchronization is established. By way of example, by making use of at least two validators 320, 340 within two different units 303, 304 of the communication bus 300, each unit 303, 304 having ASIL B, an overall integrity according to ASIL D may be achieved.

Hence, forward and reverse synchronization between an Ethernet communication network 210 (as master bus) and all other communication buses 300 (as slave buses) may be performed according to the PTP protocol (using sync and sync follow up messages) and possibly using AUTOSAR (multiple time domains 221, 321), wherein all time domain generated time stamps may be monitored for time corruption and clock synchronization Jitter detection according to Safety Integrity Level ASIL D.

Time synchronization of different bus systems 300 with Safety Integrity Level ASIL D may be achieved, if Ethernet itself is implemented and validated to an integrity level of ASIL D. This may be achieved by mutual monitoring of relevant clock nodes 304 on the bus system 300 side by side with monitoring from Ethernet time gateway node 303 on the same bus system 300. Alternatively, time synchronization of different bus systems 300 with Safety Integrity Level ASIL B may be achieved.

Figure 4:
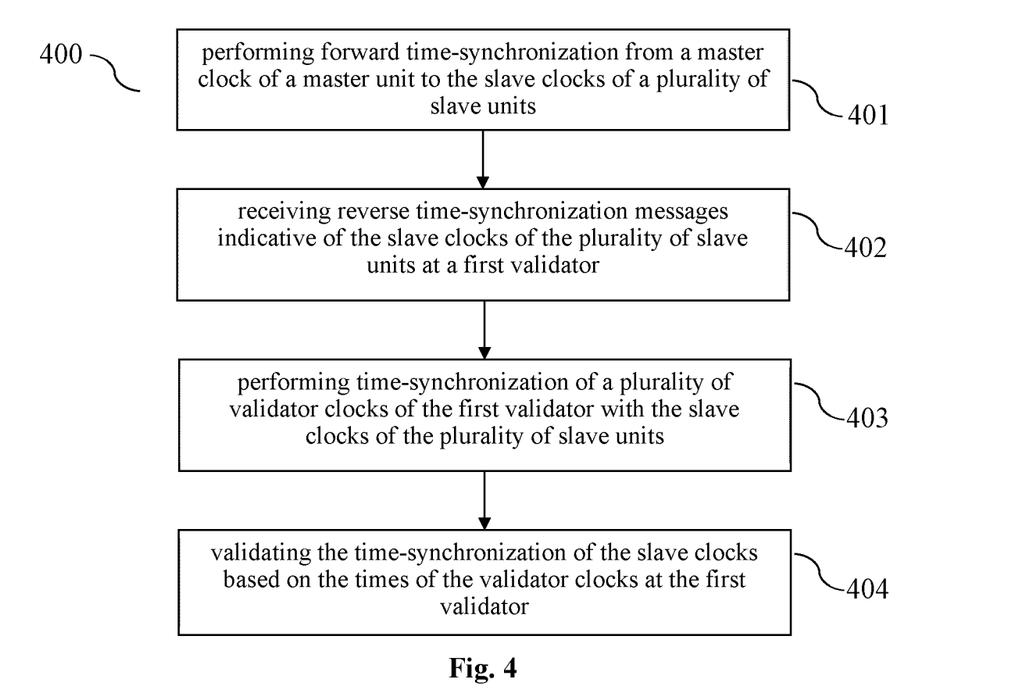
FIG. 4 shows a flow chart of an example method for performing time-synchronization.

FIG. 4 shows a flow chart of an example computer-implemented method 400 for performing time-synchronization between a master clock 313 of a master unit 303 and a plurality of slave clocks 314, 315, 316 of a corresponding plurality of slave units 304, 305, 306 within a communication bus system 300 (notably within a CAN-FD bus system and/or a FlexRay bus system). The master unit 303 may comprise or may be a gateway unit which is configured to couple the communication bus system 300 to another communication network 210, such as an Ethernet network.

The method 400 comprises sending 401 a forward time-synchronization message 331 indicative of the master clock 313 from the master unit 303 to the plurality of slave units 304, 305, 306, in order to enable the plurality of slave units 304, 305, 306 to time-synchronize their respective slave clocks 314, 315, 316 with the master clock 313. In other words, a forward time-synchronization may be performed between the master clock 313 and the plurality of slave clocks 314, 315, 316.

In addition, the method 400 comprises receiving 402 a reverse time-synchronization message 332 indicative of the respective slave clock 314, 315, 316 from each of the plurality of slave units 304, 305, 306 at a first validator 320. The first validator 320 may be part of the master unit 303. The method 400 further comprises time-synchronizing 403 a plurality of validator clocks 324, 325, 326 of the first validator 320 to the corresponding plurality of slave clocks 314, 315, 316, respectively, using the reverse time-synchronization messages 332 from the plurality of slave units 304, 305, 306. Hence, a reverse time-synchronization may be performed with regards to the plurality of slave clocks 314, 315, 316 and the corresponding plurality of validator clocks 324, 325, 326 of the first validator 320.

Furthermore, the method 400 comprises validating 404 the time-synchronization between the plurality of slave clocks 314, 315, 316, notably between the master clock 313 and the plurality of slave clocks 314, 315, 316, at the first validator 320 based on the plurality of validator clocks 324, 325, 326 of the first validator 320.

The time-synchronized slave clocks 314, 315, 316 and master clock 313 may be used for exchanging and/or processing data (e.g. sensor data) within the communication bus system 300 and/or within a vehicle 100. As a result of this, the quality of the processed data may be improved.

The synchronization scheme described herein may ensure time synchronization between different units 303, 304, 305, 306 (e.g. sensors and/or gateways and/or fusion units) within a communication bus system 300 with a relatively high integrity level, e.g. ASIL D, even if the units 303, 304, 305, 306 exhibit a relatively low integrity level, e.g. ASIL B.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A method for performing time-synchronization between a master clock of a master unit and a plurality of slave clocks of a corresponding plurality of slave units within a communication bus system, the method comprising:
    sending a forward time-synchronization message indicative of the master clock from the master unit to the plurality of slave units, in order to enable the plurality of slave units to time-synchronize their respective slave clocks with the master clock;
    receiving a reverse time-synchronization message indicative of the respective slave clock from each of the plurality of slave units at a first validator;
    time-synchronizing a plurality of validator clocks of the first validator to the corresponding plurality of slave clocks, respectively, using the reverse time-synchronization messages from the plurality of slave units; and
    validating the time-synchronization between the plurality of slave clocks at the first validator based on the plurality of validator clocks of the first validator,
    wherein the plurality of validator clocks of the first validator are implemented in a corresponding plurality of different time domains of a Synchronized Time-Base Manager of an AUTOSAR standard.

2. The method according to claim 1, further comprising:
    time-synchronizing validator clocks of a second validator to at least some of the plurality of slave clocks using the reverse time-synchronization messages from at least some of the plurality of slave units, and/or to the master clock using the forward time-synchronization message from the master unit; and
    validating the time-synchronization between the plurality of slave clocks at the second validator based on the validator clocks of the second validator.

3. The method according to claim 2, wherein at least one of:
    the first validator is located at and/or implemented within the master unit;
    the second validator is located at and/or implemented within a slave unit of the plurality of slave units; or
    the first validator and the second validator are part of different communication bus systems.

4. The method according to claim 2, wherein the method comprises validating the plurality of slave clocks for the communication bus system if the plurality of slave clocks has been validated at the first validator and at the second validator.

5. The method according to claim 2, wherein the method comprises validating the plurality of slave clocks for the communication bus system only if the plurality of slave clocks has been validated at the first validator and at the second validator.

6. The method according to claim 1, wherein:
    the master unit comprises a gateway between the communication bus system and an Ethernet communication network; and
    the method comprises time-synchronizing the master clock with a clock of a unit within the Ethernet communication network.

7. The method according to claim 1, wherein the communication bus system comprises at least one of a Controller Area Network bus system or a FlexRay communication network.

8. The method according to claim 1, wherein validating the time-synchronization between the plurality of slave clocks at the first validator comprises at least one of:
    comparing validator times of the plurality of validator clocks of the first validator;
    validating the plurality of slave clocks at the first validator when the validator times of the plurality of validator clocks of the first validator are time-synchronized; or
    determining that the plurality of slave clocks is not time-synchronized when the validator times of at least two of the plurality of validator clocks of the first validator are not time-synchronized.

9. The method according to claim 1, wherein at least one of the forward time-synchronization message or the reverse time-synchronization message is in accordance with a PTP protocol.

10. The method according to claim 1, wherein:
    at least one of the plurality of slave clocks or the plurality of slave units is associated with a plurality of sensors; and
    each of the sensors is configured to provide sensor data with a time stamp generated by the respective slave clock.

11. The method according to claim 10, wherein the time stamp is generated by the respective slave clock according to a pre-determined safety integrity ASIL level.

12. The method according to claim 1, wherein the time-synchronization between the plurality of slave clocks is validated according to at least one of safety integrity ASIL B or safety integrity ASIL D.

13. A system for performing time-synchronization between a master clock of a master unit and a plurality of slave clocks of a corresponding plurality of slave units within a communication bus system, wherein the system is configured to:
    send a forward time-synchronization message indicative of the master clock from the master unit to the plurality of slave units, in order to enable the plurality of slave units to time-synchronize their respective slave clocks with the master clock;
    receive a reverse time-synchronization message indicative of the respective slave clock from each of the plurality of slave units at a first validator;
    time-synchronize a plurality of validator clocks of the first validator to the corresponding plurality of slave clocks, respectively, using the reverse time-synchronization messages from the plurality of slave units; and
    validate the time-synchronization between the plurality of slave clocks at the first validator based on the plurality of validator clocks of the first validator,
    wherein the plurality of validator clocks of the first validator are implemented in a corresponding plurality of different time domains of a Synchronized Time-Base Manager of an AUTOSAR standard.

\* \* \* \* \*